US010288738B1

(12) United States Patent
Koenck et al.

(10) Patent No.: US 10,288,738 B1
(45) Date of Patent: May 14, 2019

(54) PRECISION MOBILE BASELINE DETERMINATION DEVICE AND RELATED METHOD

(71) Applicant: Rockwell Collins, Inc., Cedar Rapids, IA (US)

(72) Inventors: Steven E. Koenck, Cedar Rapids, IA (US); James H. Doty, Cedar Rapids, IA (US); Brad A. Walker, Mount Vernon, IA (US); Michael C. Gokay, Dayton, OH (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 644 days.

(21) Appl. No.: 14/231,850

(22) Filed: Apr. 1, 2014

(51) Int. Cl.
*G01S 19/05* (2010.01)

(52) U.S. Cl.
CPC ..................... *G01S 19/05* (2013.01)

(58) Field of Classification Search
CPC .......... G01S 19/53; G01S 19/54; G01S 19/51; G01S 19/43; G01S 19/47; G01C 11/00; G01C 11/02; G01C 11/025; G01C 11/04; G01C 15/004
See application file for complete search history.

(56) References Cited

U.S. PATENT DOCUMENTS

| | | | | |
|---|---|---|---|---|
| 2,705,320 A * | 3/1955 | Palmer | .................... | G01S 13/84 342/109 |
| 3,266,037 A * | 8/1966 | Page | ..................... | G01S 7/2926 342/134 |
| 3,718,751 A * | 2/1973 | Landre | ................... | H04N 9/097 348/339 |
| 4,741,340 A * | 5/1988 | Batina | ................ | A61N 1/37252 128/903 |
| 5,379,045 A * | 1/1995 | Gilbert | .................... | G01S 19/07 342/352 |
| 5,379,320 A * | 1/1995 | Fernandes | ................ | H01Q 3/14 375/141 |
| 5,999,123 A * | 12/1999 | Disselkoen | ............. | G01S 19/43 342/357.26 |

(Continued)

OTHER PUBLICATIONS

Bushnell Laser rangefinder User Manual 2010 (Year: 2010).*

*Primary Examiner* — Vladimir Magloire
*Assistant Examiner* — Daniel P Malley, Sr.
(74) *Attorney, Agent, or Firm* — Angel N. Geredzhikov; Donna P. Suchy; Daniel M. Barbieri

(57) ABSTRACT

Devices, systems, and methods for determining azimuth, elevation, or object position relative to a baseline using an integrated sighting device. The integrated sighting device includes a GPS receiver, an inertial measurement unit (IMU), an optical aperture, a microcomputer, and a handheld housing. The integrated sighting device, during transit from a reference position to a sighting position, determines a first angle between the sighting position and the reference position based on carrier phase input received during the transit. Orientation input is received from the IMU at the sighting position as the integrated sighting device is aimed and sighted along a line of sight to the reference position. The baseline is generated based on a second angle of the orientation input correlating with the first angle. The baseline is used as a reference for determining azimuth, elevation, or position of other objects or devices.

14 Claims, 13 Drawing Sheets

(56) References Cited

U.S. PATENT DOCUMENTS

| | | | | |
|---|---|---|---|---|
| 6,670,917 | B1* | 12/2003 | Maniscalco | G01C 15/00 342/357.57 |
| 6,738,012 | B1* | 5/2004 | Kirkpatrick | F41H 11/02 250/203.6 |
| 8,525,727 | B2* | 9/2013 | Roh | G01S 19/22 342/357.35 |
| 2005/0038627 | A1* | 2/2005 | Brimhall | G01C 15/002 702/150 |
| 2005/0137799 | A1* | 6/2005 | Alban | G01C 21/165 701/470 |
| 2007/0004331 | A1* | 1/2007 | Twitchell, Jr. | G01S 19/03 455/1 |
| 2007/0139262 | A1* | 6/2007 | Scherzinger | G01C 15/00 342/357.32 |
| 2010/0066603 | A1* | 3/2010 | O'Keefe | G01C 15/00 342/357.27 |
| 2011/0006772 | A1* | 1/2011 | Olsson | G01V 3/15 324/326 |
| 2012/0013736 | A1* | 1/2012 | Graesser | G01C 15/06 348/135 |
| 2012/0163656 | A1* | 6/2012 | Wang | G01C 15/00 382/103 |
| 2013/0211713 | A1* | 8/2013 | Georgy | G01S 19/47 701/468 |
| 2013/0328718 | A1 | 12/2013 | Frey, Jr. | |
| 2015/0009067 | A1* | 1/2015 | Rudow | G01S 19/41 342/357.51 |
| 2015/0219767 | A1* | 8/2015 | Humphreys | G01S 19/43 342/357.26 |

\* cited by examiner

PRECISION MOBILE BASELINE DETERMINATION DEVICE AND RELATED METHOD

FIELD OF THE INVENTION

The present invention relates generally to mobile position determining devices and related systems. More particularly, embodiments of the present invention relate to a device and related system for determining a precise mobile baseline from a fixed point in space.

BACKGROUND

There are a number of mobile communication applications requiring precise determination of the position and orientation of a sensing platform. Examples may include directing satellite communication antennas precisely toward geosynchronous satellites, and directing mobile line-of-sight laser or radio communication devices toward each other.

A Global Positioning System (GPS) receiver is a widely used method for determination of position. However, GPS can only determine an azimuth or direction the platform is moving (a heading) by determining the positions of a series of measured locations over time. In some situations, a user may be desirous of maintaining a fixed position.

Laser designators and laser rangefinders can determine a range from a sensing platform position to a remote object. However, these devices may lack the ability to accurately determine a position and azimuth from the reference position to the remote object.

A digital magnetic compass may offer a certain level of azimuth measuring accuracy. However, these devices may be prone to errors caused by perturbations of magnetic interference. A magnetic compass coupled with an Inertial Measurement Unit (IMU) may be less affected by transient magnetic perturbations, but may still be affected by the same magnetic errors and thus limited in accuracy in areas of magnetic fluctuation. Such areas of magnetic fluctuation may include areas of potential desired operation including around large metallic structures and near or in vehicles.

Differential GPS systems can provide a precise solution. However, these systems require two GPS receivers doubling the weight required for an operator to carry into the field.

Some systems may employ two GPS antennas to determine a pointing vector of a system. A dual GPS antenna element system is well-known in the art of differential GPS. Again, as above, two antenna elements increases weight and power in addition to a requirement to continuously receive a signal from a second antenna element.

Dual GPS systems coupled with a magnetic compass may find limited operational precision. As above, external magnetic interference may inhibit an accurate baseline determination between two points.

Additional applications may require radio frequency communications between sensing elements to update position information. For example, a pseudolite may receive a GPS signal and retransmit the received signal to additional receivers in the vicinity. These Radio Frequency (RF) transmissions, however, may undesirably reveal information about the pseudolite including presence, location and origin.

Additional applications may require multiple GPS units to determine a baseline between two locations. A first GPS receiver at the first location may communicate with a second GPS receiver at the second location. Multiple receivers require twice the power, twice the weight, and to be mobile, must be carried, often in a backpack.

Should the remote position be dangerous to the user, current limitations in mobility may drive users to a more distant reference position. If a user must evacuate the reference position due to unforeseen events, current cumbersome devices may inhibit movement. Also current cumbersome devices, if discarded, may contain sensitive information the user may not desire to share.

Therefore, a need remains for a mobile device and system enabling precise determination of a baseline from a fixed point in space using a single antenna with a single GPS receiver.

SUMMARY

Accordingly a preferred embodiment of the present invention may provide an integrated sighting device and mobile system for determining a precise azimuth baseline from a fixed point in space. The integrated sighting device includes a precise GPS receiver, an inertial measurement unit, an optical aperture, and an embedded microcomputer for computation and control. The integrated sighting device may capture a precise reference baseline by selecting, locating and marking a first point in space (reference position), moving to and stopping at a second point in space (sighting position), and optically aiming the integrated sighting device at the first point. The integrated sighting device precisely measures relative angular movement from the reference baseline via the inertial measurement unit.

One embodiment of the present invention may be directed to a mobile integrated sighting device for determination of a precise azimuth baseline from a fixed point in space, comprising: a housing, the housing configured for mobility and protection, a global positioning system receiver associated with the housing, an antenna associated with the global positioning system receiver, an inertial measurement unit associated with the housing, the inertial measurement unit configured for measuring an orientation, at least one light source associated with the housing, at least one digital imaging device associated with the housing, a microcomputer associated with the housing, the microcomputer configured for: receiving a reference position solution from the global positioning system receiver, the reference position solution identifying a reference position, receiving a sighting position solution from the global positioning system receiver, the sighting position solution identifying a sighting position, receiving a global positioning system carrier cycle count from the global positioning system receiver as the integrated sighting device is transported from the reference position to the sighting position, determining a first baseline utilizing the global positioning system carrier cycle count, the first baseline between the sighting position and the reference position, receiving an input from the inertial measurement unit, the input including a sighting azimuth from the sighting position to the reference position, determining a second baseline utilizing the sighting azimuth, the second baseline between the sighting position and the reference position, determining the precise azimuth baseline based on a correlation of the first baseline with the second baseline, displaying the precise azimuth baseline to a user on a display.

An additional embodiment of the present invention may include a device wherein the microcomputer is further configured to algorithmically stabilize an unintentional motion of the housing and to determine an angular scale factor, the determining based on at least one 360 degree rotational input from the inertial measurement unit.

An additional embodiment of the present invention may include a device wherein the microcomputer is configured to: compare a first digital image of the reference position with a second digital image of the reference position, determine at least one corresponding feature between the first digital image and the second digital image, and determine the second baseline based on the at least one corresponding feature.

An additional embodiment of the present invention may include a device wherein the reference position is further configured with a reference position indicator, the reference position indicator configured to be illuminated by the at least one light source and sensed by the at least one digital imaging device.

An additional embodiment of the present invention may include a device wherein the microcomputer is configured to update the precise azimuth baseline based on the at least one corresponding feature.

An additional embodiment of the present invention may include a device wherein the global positioning system further comprises a global positioning system antenna element external to the housing, the antenna element external to the housing configured for one of: wired and wireless transmission of a second signal to the global positioning system receiver associated with the housing.

An additional embodiment of the present invention may include a device wherein the global positioning system antenna element external to the housing further comprises a Triggered Optical Global Positioning System Repeater (TOGR), the TOGR configured for: receiving a positioning signal from at least one global positioning system satellite vehicle, receiving a trigger signal from the integrated sighting device, transmitting the positioning signal for a period after receiving the trigger signal, wherein the transmitted positioning signal further includes at least one of: a wireless transmission, an optical transmission, and a wired transmission.

An additional embodiment of the present invention may include a device wherein the integrated sighting device is further configured for: receiving the sighting position solution via a user input, and receiving the reference position solution via the user input.

An additional embodiment of the present invention may include a system for determination of a precise azimuth baseline from a fixed point in space, comprising: a housing configured for mobility and protection, a global positioning system receiver associated with the housing, an antenna associated with the global positioning system receiver, an inertial measurement unit associated with the housing, the inertial measurement unit coupled to the housing, the inertial measurement unit configured for measuring an orientation of the housing, at least one light source within the housing, at least one digital imaging device within the housing, a microcomputer within the housing, the microcomputer configured for: receiving a reference position solution from the global positioning system receiver, the reference position solution identifying a reference position, receiving a sighting position solution from the global positioning system receiver, the sighting position solution identifying a sighting position, receiving a global positioning system carrier cycle count from the global positioning system receiver as the integrated sighting device is transported from the reference position to the sighting position, determining a first baseline utilizing the global positioning system carrier cycle count, the first baseline between the sighting position and the reference position, receiving an input from the inertial measurement unit, the input including a sighting azimuth from the sighting position to the reference position, determining a second baseline utilizing the sighting azimuth, the second baseline between the sighting position and the reference position, determining the precise azimuth baseline based on a correlation of the first baseline with the second baseline, displaying the precise azimuth baseline to a user on a display.

An additional embodiment of the present invention may include a computer readable medium having non-transitory computer readable program code embodied therein for determination of a precise azimuth baseline from a fixed point in space, the computer readable program code comprising instructions which, when executed by a computer device or processor, perform and direct the steps of: receiving a user input from a user, the user input directed to an integrated sighting device, receiving a reference position solution from a global positioning system receiver, the reference position solution identifying the reference position, receiving a sighting position solution from the global positioning system receiver, the sighting position solution identifying the sighting position, receiving a global positioning system carrier cycle count from the global positioning system receiver as the integrated sighting device is transported from the reference position to the sighting position, determining a first baseline utilizing the global positioning system carrier cycle count, the first baseline between the sighting position and the reference position, receiving an input from an inertial measurement unit, the inertial measurement unit associated with the integrated sighting device, the input including a sighting azimuth from the sighting position to the reference position as the integrated sighting device is directed at the reference position, determining a second baseline utilizing the sighting azimuth, the second baseline between the sighting position and the reference position, determining the precise azimuth baseline based on a correlation of the first baseline with the second baseline, displaying the precise azimuth baseline to a user on a display.

An additional embodiment of the present invention may include an azimuth finder, comprising: a housing for protectively associating, (1) a Global positioning system receiver, (2) a global positioning system carrier cycle counter, (3) at least one of an orientation and velocity detector, (4) a sight, (5) a computer, (6) a user interface, and (7) a power supply for powering at least the receiver, detector, and computer, a memory associated with the computer having at least a first coordinate position storage and a second coordinate position storage, the first coordinate position local to and a counted number of global positioning system carrier cycles from the second coordinate position, and sighted azimuth finder means for determining a sighted azimuth from the second coordinate position to the first coordinate position.

An additional embodiment of the present invention may include a device wherein the housing is further configured for protectively associating at least one light source, a rangefinder, a digital imaging device, and a display.

An additional embodiment of the present invention may include a method for determination of a precise azimuth baseline from a fixed point in space, comprising: means for receiving a user input from a user, means for receiving a reference position solution, the reference position solution identifying the reference position, means for receiving a sighting position solution, the sighting position solution identifying the sighting position, means for receiving a global positioning system carrier cycle count from at least one global positioning system satellite vehicle signal, the global positioning system carrier cycle count received during a movement from the reference position to the sighting position, means for determining a first baseline utilizing the global positioning system carrier cycle count, the first baseline between the sighting position and the reference position, means for receiving an inertial measurement unit input, the inertial measurement unit input including a sighting azimuth from the sighting position to the reference position, means for determining a second baseline from the inertial measurement unit input, the second baseline between the sighting position and the reference position, means for correlating the first baseline with the second baseline, means for determining the precise azimuth baseline based on the correlation, and means for displaying the precise azimuth baseline to a user.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Integrated Sighting Device Overview

Embodiments of the present invention may provide for an integrated sighting device and mobile system for determining an accurate azimuth baseline from a reference position to a sighting position. The integrated sighting device includes a precise GPS receiver, an inertial measurement unit, an optical aperture, and an embedded microcomputer for computation and control. The integrated sighting device may capture a precise reference baseline by selecting, locating and marking a first point in space (reference position), moving to and stopping at a second point in space (sighting position), and optically aiming the integrated sighting device at the first point. The integrated sighting device precisely measures relative angular movement from the reference baseline via the inertial measurement unit.

Figure 1A:
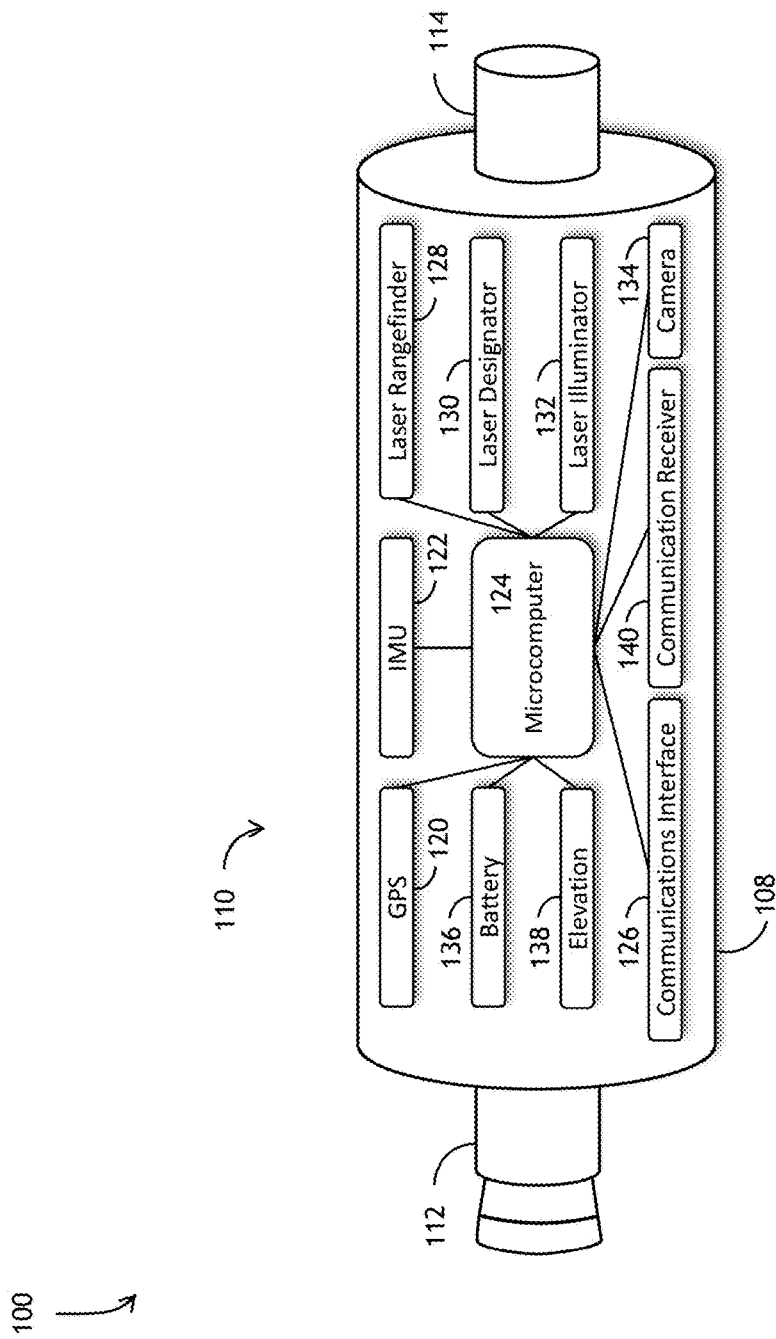
FIG. 1A is a diagram of an integrated sighting device exemplary of an embodiment of the present invention.

Referring to FIG. 1A, a diagram of an integrated sighting device exemplary of an embodiment of the present invention is shown. Embodiments of the present invention may employ a small form factor single integrated sighting device 110 including a housing 108. Within the housing 108, integrated sighting device 110 may further comprise a GPS receiver 120, an Inertial Measurement Unit (IMU) 122, an integrated microcomputer 124 with associated system software, a laser rangefinder 128, laser designator 130, laser illuminator 132, a digital camera 134 with telephoto optics 114, a communication interface 126, an elevation module 138, and a rechargeable and/or replaceable battery power source 136.

The digital camera 134 may further include at least a visual mode, a Near Infrared (NIR) mode, and a Shortwave Infrared (SWIR) mode and the like for alternate imaging options.

A communication receiver 140 may include a receiver of a plurality of communication signals of a plurality of frequencies where the integrated sighting device 110 is capable of indicating to the user when the communication receiver 140 is aligned and receiving one of the plurality of communication signals.

In addition, in one embodiment, a Micro Electro Mechanical System (MEMS) IMU 122 may be incorporated within the integrated sighting device 110 to enable mobile platform orientation determination. The present invention may optimally weigh five pounds, have a front and back cross-section of three and one-half inches, be nine inches long, and operate for 24 hours on a single battery charge.

Preferably, integrated sighting device 110 may be accurate to a 10 meter (m) Circular Error Probable (CEP) with a desired range of 100 m to 3.5 km. A desired angular accuracy goal may be on the order of 1 milliradian (mrad).

Single GPS Operation

Figure 2:
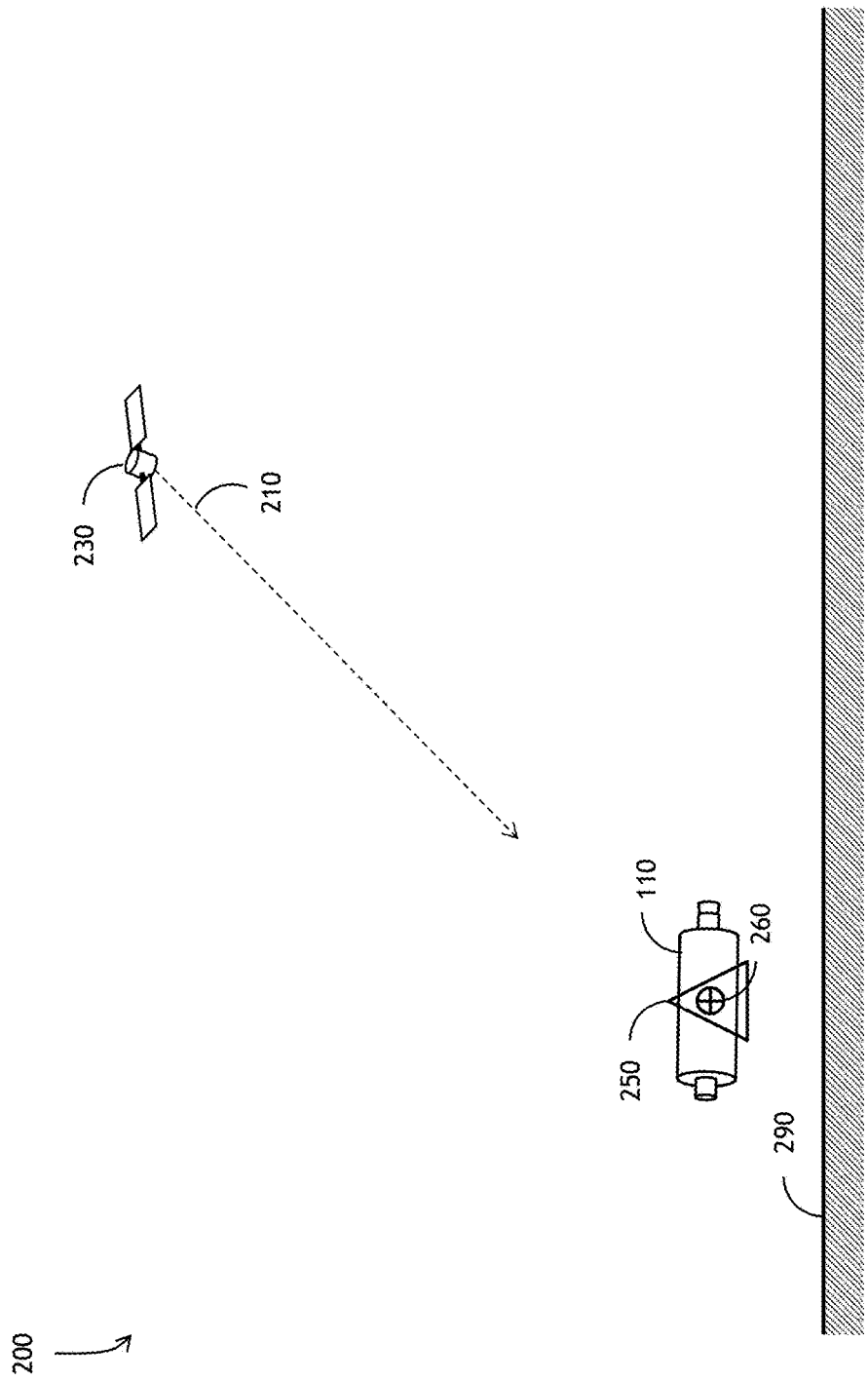
FIG. 2 is a diagram of a reference position exemplary of an embodiment of the present invention.

Referring to FIG. 2, a diagram of a reference position exemplary of an embodiment of the present invention is shown. Preferably, integrated sighting device 110 may operate with a single GPS receiver. In operation, a user may select a reference position 250 and determine a precise positioning solution for the reference position 250 via the GPS 120. Reference position 250 may have an elevation above a plane 290. In many cases, the plane 290 will be the surface of the earth. In one embodiment, integrated sighting device 110 may be placed at the reference position during the time required for the GPS 120 to accurately determine the positioning solution for the reference position 250. In embodiments, integrated sighting device 110 may operate with or without a Selective Availability Anti-spoofing Module (SAASM) enabled.

Preferably, a reference marker 260 may be placed at the reference position 250 where GPS functionality is available. The reference marker 260 may aid the user in precisely directing the integrated sighting device 110 toward the reference position 250. Ideally, reference marker 260 may be a tactically insignificant, visually identifiable marker oriented to aid the user in precise aiming from a distance. For example, a reflective material with one adhesive surface may be attached to the reference position 250. One example of reference marker 260 may include reflective tape and glint tape visible to the user in at least one spectrum (e.g., visual, infrared, etc.). The reference marker 260 may include an optical band pass filter matching the wavelength of the laser illuminator 132 and/or a polarizing filter matching the polarization orientation of the laser illuminator 132 for maximum covertness.

Sighting Position

Figure 3A:
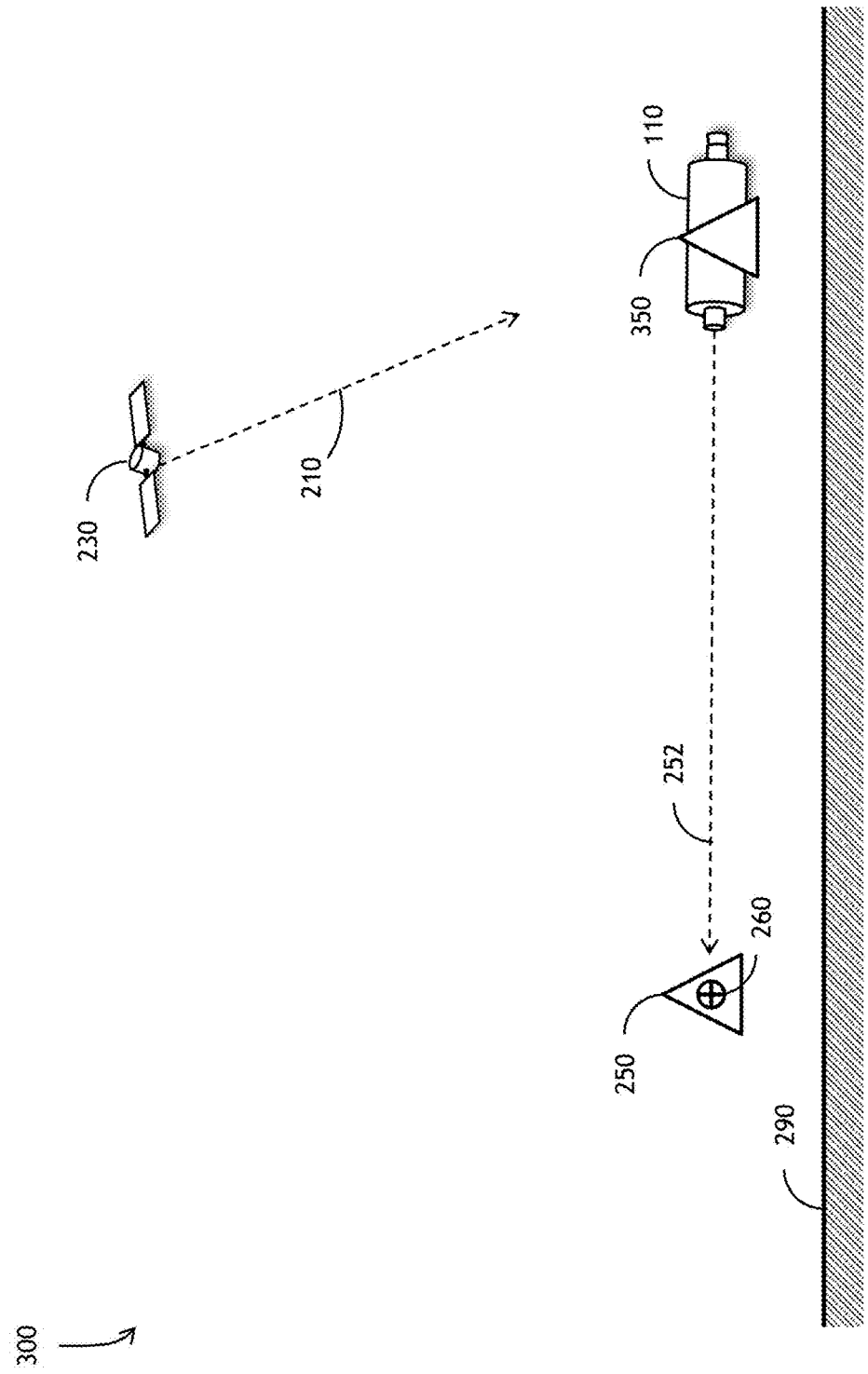
FIG. 3A is a diagram of a sighting position exemplary of an embodiment of the present invention.

Referring to FIG. 3A, a diagram of a sighting position exemplary of an embodiment of the present invention is shown. In operation, once integrated sighting device 110 has determined the precise positioning solution for the reference position 250, the user may transport the integrated sighting device 110 from the reference position 250 to a sighting position 350. During this transport, the integrated sighting device 110 maintains GPS signal 210 reception and receives and stores a count of carrier cycles of the GPS signal enabling the integrated sighting device 110 to determine a precise (within, for example, 20 cm) distance and azimuth between the reference position 250 and the sighting position 350. This precise tracking of relative motion is not a precise GPS position update, but a precise vector from the reference position 250 to the sighting position 350 via a specific number of carrier cycles in a specific direction. Preferably, the sighting position 350 may be at least 100 m distant from the reference position 250. A lesser distance may be undesirable as accuracy may decrease.

During the transport from reference position 250 to sighting position 350, a certain amount of time is required for transport.

Figure 3B:
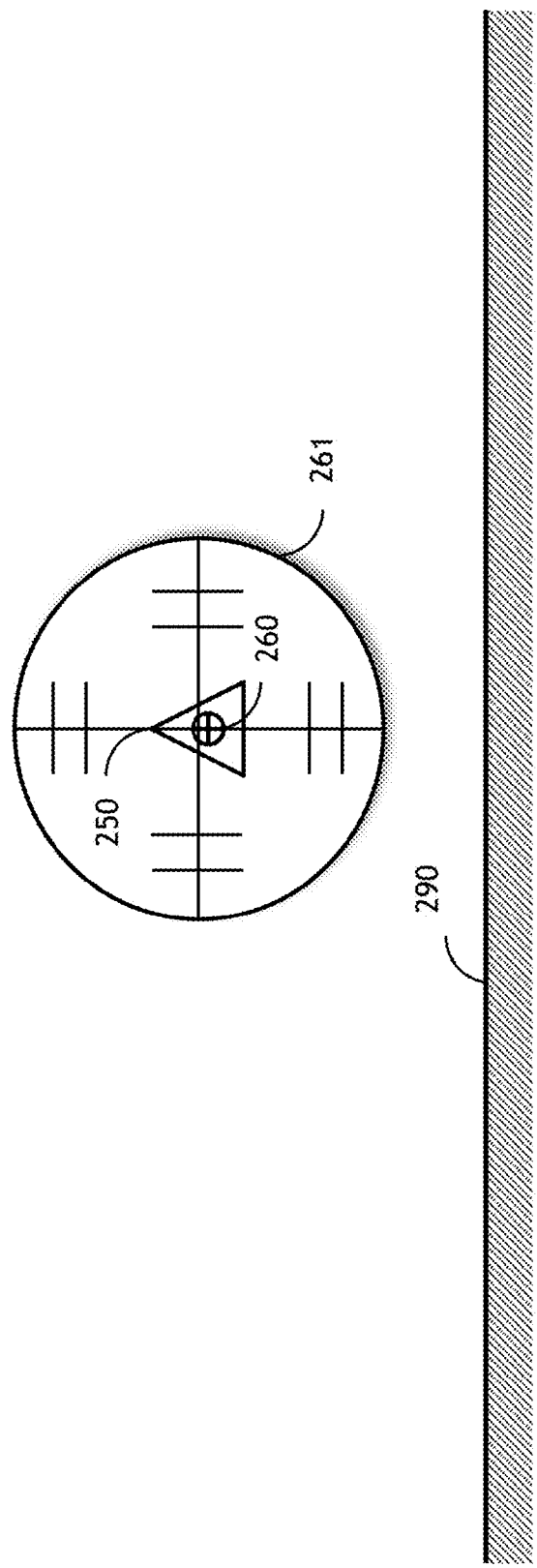
FIG. 3B is a diagram of a sight exemplary of an embodiment of the present invention.

Once the user arrives at the sighting position 350, the user may allow the GPS to acquire a precise position solution for the sighting position 350. Once the GPS has acquired a precise positioning solution for the sighting position 350, the user optically sights the integrated sighting device 110 back to the reference position 250 along line of sight 252 allowing the IMU 122 to store the precise azimuth and elevation baseline between the reference and sighting positions 250 and 350 (see, for example, FIG. 3B and sight 261). In addition, the digital camera 134 within integrated sighting device 110 may store a digital image of the reference position 250 including the reference marker 260 to enable the user to easily reacquire the reference position.

In embodiments, the user may illuminate the reference marker 260 with, for example, an eye safe laser illuminator 132 to enable the operator to visually acquire the reference marker 260 with the optics 112 and 114 and camera 134 of the integrated sighting device 110. It is contemplated herein; reference marker 260 may be of a circular shape mounted to an available surface easily identifiable and sightable to the user.

At this point, the integrated sighting device 110 has stored in the IMU 122 a precise azimuth and elevation between the reference position 250 and the sighting position 350 along line of sight 252. As IMU 122 drift may occur, the user may calibrate the integrated sighting device 110 by returning to sighting the reference position 250 and calibrate the IMU 122 in azimuth and elevation to an original baseline as captured from the first sighting of reference marker 252. The integrated sighting device 110 captures the X-Y offset position of the reference marker 260 via the digital camera 134 video frame. The microcomputer 124 then calculates the angular error off bore sight and updates the IMU 122 with the corrected baseline azimuth.

In embodiments, a second reference marker angularly distant from the first reference marker 260 may be employed to calibrate an angular scale factor of the integrated sighting device 110. For example, the user may sight the first reference marker 260 and then angularly position the integrated sighting device 110 to view the second reference marker to calibrate the angular displacement between first and second reference markers.

In addition, embodiments of the present invention may incorporate software within the microcomputer 124 to reduce or eliminate inadvertent operator handheld shake movements during operation. For example, the integrated sighting device 110 may accurately operate without a requirement for a tripod or other stabilizing platform enabling an operator to reduce a requirement to carry a stabilizing device to stabilize integrated sighting device 110. Digital algorithmic solutions to reduce or eliminate operator movements may assist the integrated sighting device 110 in achieving desired accuracy.

For example, the integrated sighting device 110 may enable the user to capture an image of the reference marker 260. While sighting the reference marker 260 a second time, the integrated sighting device 110 may instantaneously determine the precise baseline to the reference marker 260 position based on the captured image regardless of slight operator movements of the integrated sighting device 110. In operation, the integrated sighting device 110 may capture a frame of the digital image, measure the output of the IMU, and determine a precise baseline that is stored based on the digital image.

Figure 1B:
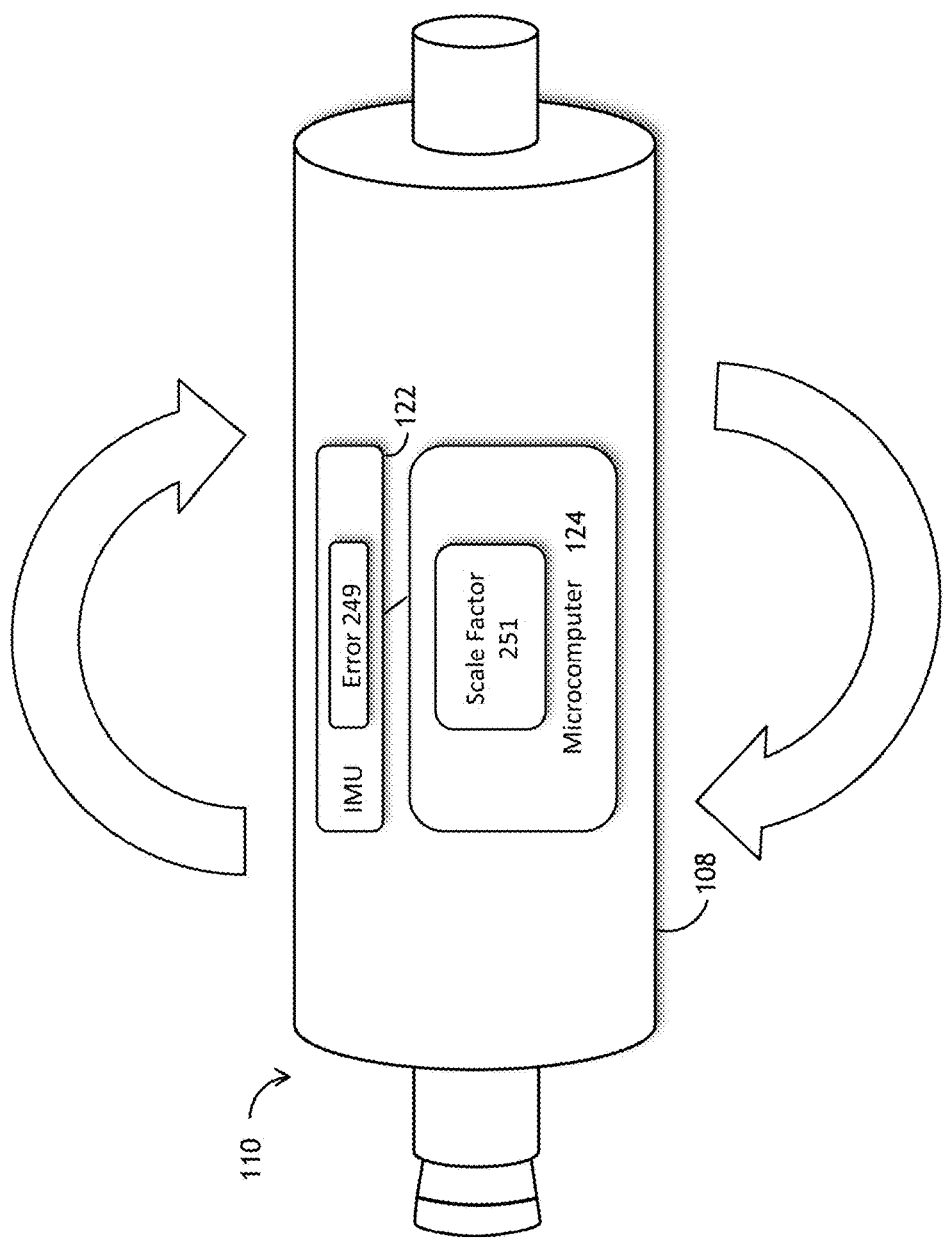
FIG. 1B is a diagram of an integrated sighting device exemplary of an embodiment of the present invention.

Referring now to FIG. 1B, in another embodiment of the present invention, the integrated sighting device 110 may be configured to compensate for variable temperature and additional factors that may contribute to IMU error 249 in the field. Embodiments of the present invention may determine an angular scale 251 factor by sighting the reference position 250, then rotating the integrated sighting device 110 in a 360 degree horizontal circle back to the reference position 250. In this manner, the integrated sighting device 110 may record the 360 degree circle and use that stored variable to determine a future angular offset from the reference position 250.

Snapshot Operations

Figure 4:
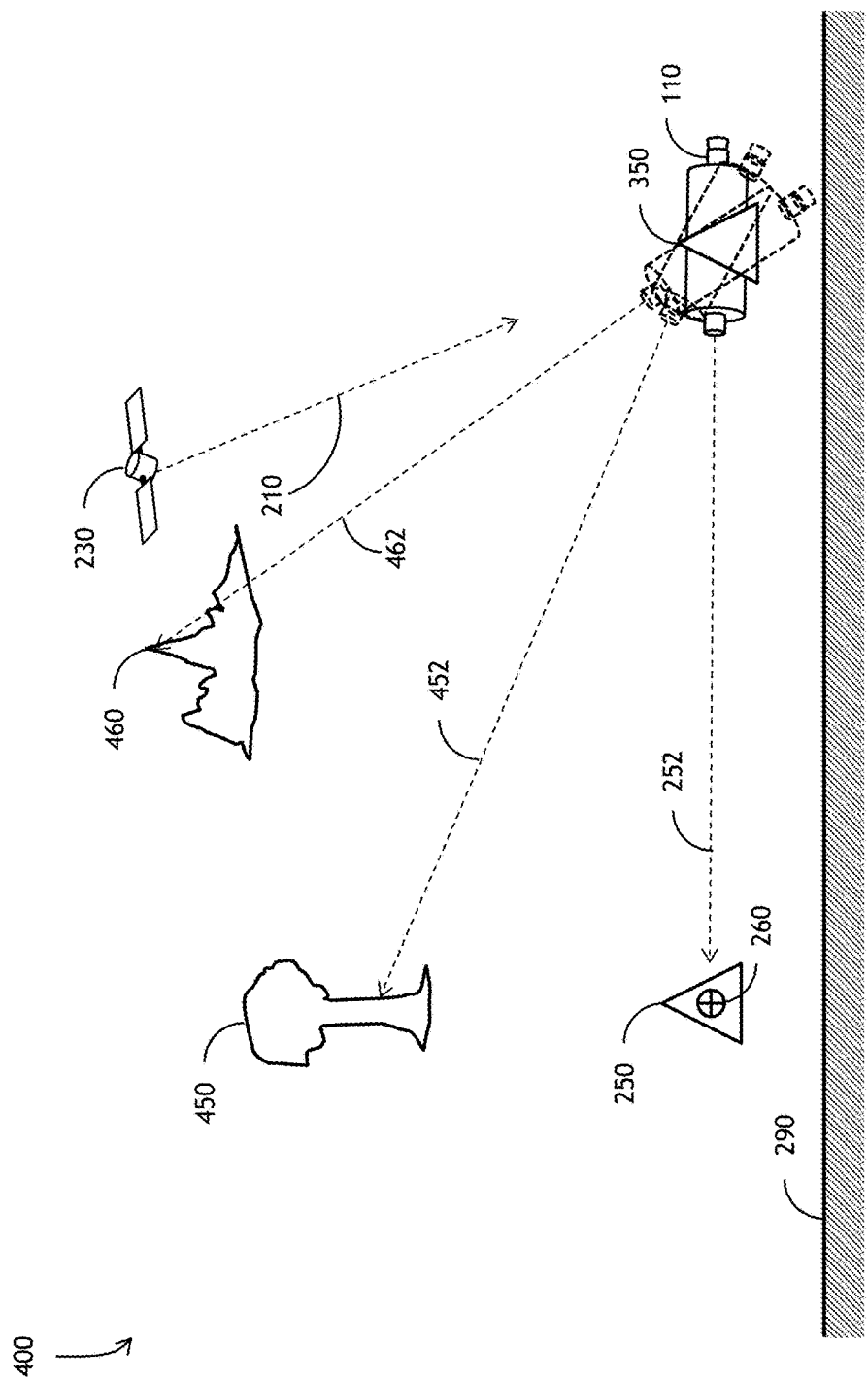
FIG. 4 is a diagram of an angularly offset plurality of positions exemplary of one embodiment of the present invention.

Referring to FIG. 4, a diagram of an angularly offset plurality of positions exemplary of one embodiment of the present invention is shown. A common IMU drift may be an exemplary 2 mrad per minute. To compensate for this drift, the user may maintain the integrated sighting device 110 at the sighting position 350 and digitally image (snapshot) an angularly offset plurality of positions 450 to 460 around the user's perimeter. Each image may possess a plurality of features recognizable by the microcomputer 124 via a comparison between a feature of a stored image and a corresponding feature of the current image. Each pixel of each digital image may possess a specific azimuth and elevation offset 452 to 462 from the reference marker 260. User may update the IMU 122 by sighting any one of the plurality of positions 450 to 460 to update the azimuth and elevation drift of the IMU 122. In addition, these snapshots of plurality of positions 450 to 460 may allow the user a reference angularly closer to an object of interest than is the reference marker 260. Instead of sighting the reference position via the reference marker 260, user may sight the mountain 460 or tree 450 via lines of sight 452 to 462 to update a drifting IMU 122 and quickly return to an object of interest.

Updates Via Snapshots

Figure 5:
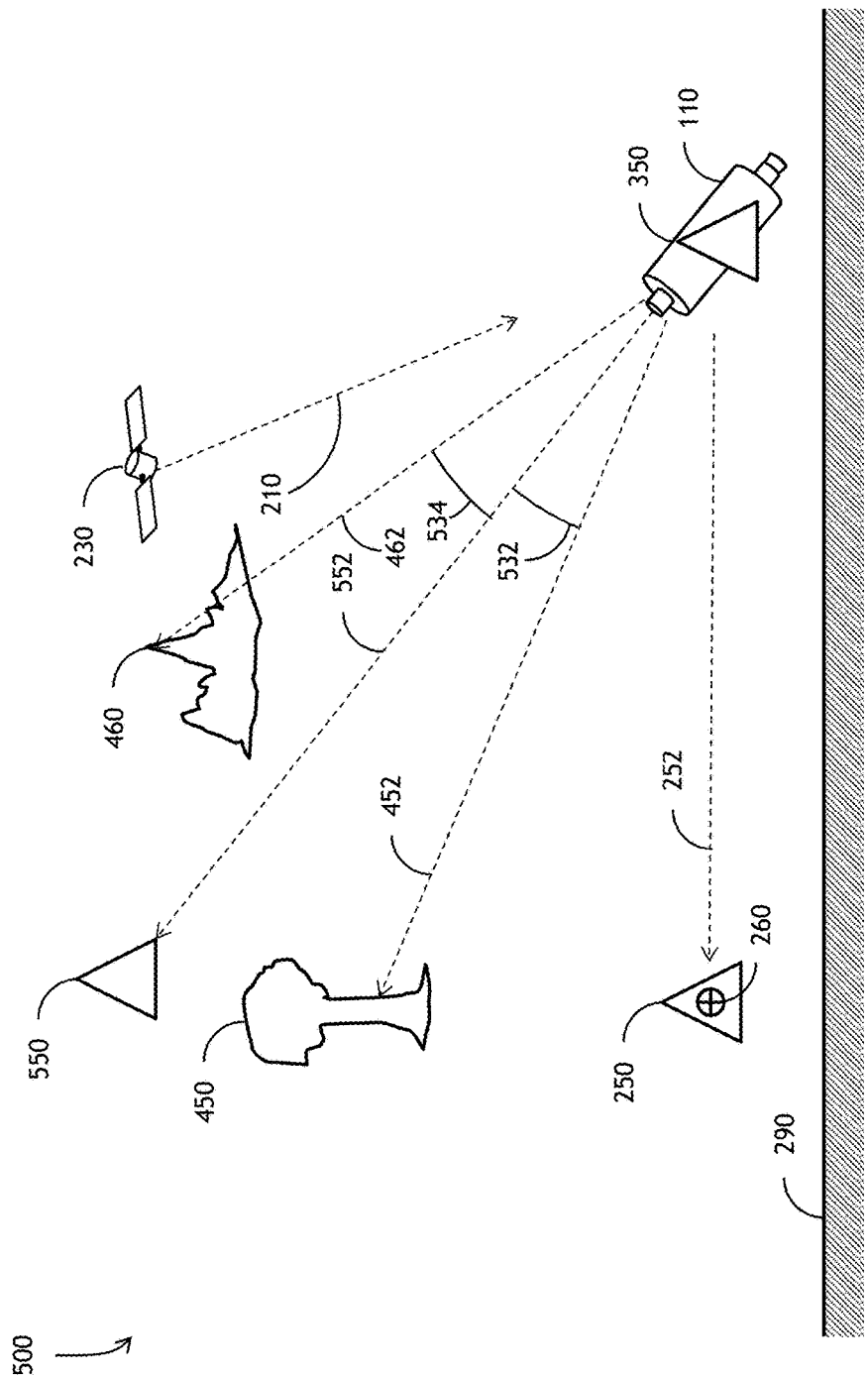
FIG. 5 is a diagram of a moving object sightable by one embodiment of the present invention.

Referring to FIG. 5, a diagram of a moving object sightable by one embodiment of the present invention is shown. For example, as an object 550 may be moving relative to one of the plurality of positions 450 to 460, the user may sight one or more of the plurality of positions 450 to 460 for an IMU update before concentrating on the moving object 550. Integrated sighting device 110 determines an angular offset 532 to 534 from one of the plurality of positions 450 to 460 to determine an azimuth 552 of object 550.

In one embodiment, integrated sighting device 110 may determine an elevation solution via an input from an accelerometer module coupled to IMU 122. Preferably, the accelerometer module may precisely and electronically determine an angular offset from horizontal to determine an elevation change.

Coupled with a range from the laser rangefinder 128, integrated sighting device 110 may determine an accurate position solution for an object within the field of view. Inputs to this position solution may include the sighting position 350 solution, the relative azimuth, elevation, and range from the sighting position 350. The position solution will involve conversion of the polar coordinate position system using the azimuth, elevation and range into cartesian coordinates that may be combined with the GPS latitude, longitude and elevation of the sighting position 350.

Dual Antenna Sighting Operation

Figure 6:
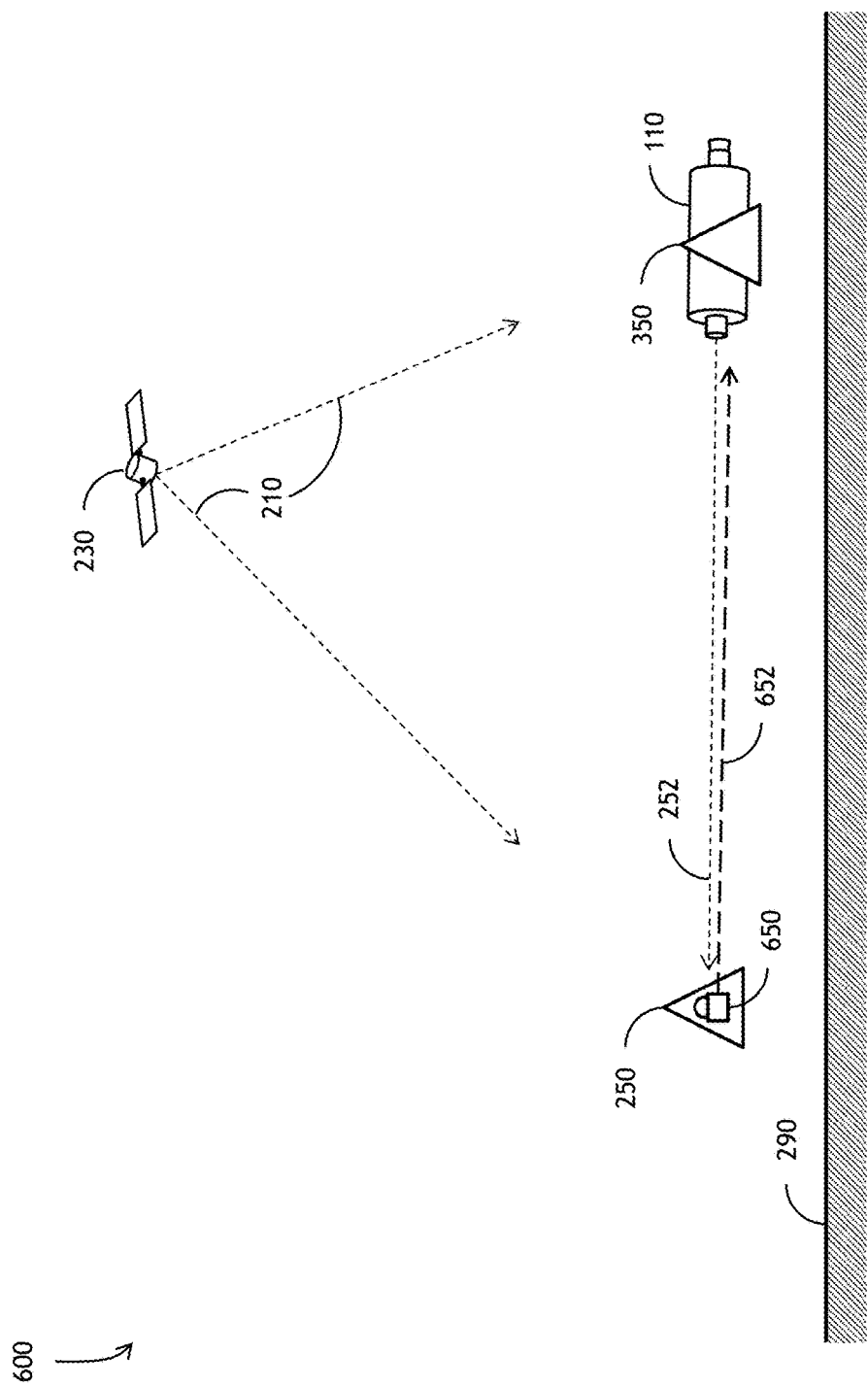
FIG. 6 is a diagram of dual antenna sighting exemplary of one embodiment of the present invention.

Referring to FIG. 6, a diagram of dual antenna sighting exemplary of one embodiment of the present invention is shown. In one embodiment, integrated sighting device 110 may function using a second antenna element 650 employed distally remote from the integrated sighting device 110. Preferably, the second antenna is not a GPS receiver to reduce size and cost of the second antenna. The second antenna element may preferably capture the GPS carrier signal and wirelessly transmit a signal 652 to the integrated sighting device 110 GPS 120 receiver. The second antenna element 650 may include a battery, at least one visibly observable antenna element, a repeater circuit board to receive the GPS carrier signal and retransmit the carrier phase of the GPS signal to the GPS receiver 120, preferably using a communication waveform different from the GPS carrier signal 210. The dual antenna azimuth determination system may utilize a highly precise differential carrier phase azimuth determination method as taught by Hwang in U.S. Pat. No. 5,021,792.

In operation, the user may place the second antenna element 650 at the first position 250 distally remote from the second position 350. Integrated sighting device 110 may receive, via communications interface 126, the signal 652 from the remote antenna element 650. During signal reception, the user may sight the visibly observable antenna element 650 with the integrated sighting device 110 to calibrate the integrated sighting device 110 IMU 122 in azimuth and elevation.

As size and weight are an issue, a wireless transmission to the integrated sighting device 110 may be preferred. However, a wired transmission is contemplated herein as one method of transmission of information from remote antenna 650 to GPS receiver 120. One disadvantage of wireless transmission is the wireless transmission may be receivable by others in the vicinity. One embodiment may include a wired remote receiver capable of wired transmission back to the integrated sighting device 110 GPS receiver 120.

As with the wireless embodiment, the wired transmission option includes a visibly observable antenna element 650 easily recognizable by the operator for sighting the second antenna element 650.

In one embodiment, second antenna element 650 may transmit the signal 652 to the integrated sighting device 110 via a Light Emitting Diode (LED) or laser diode configured with the visibly observable antenna element. This embodiment may accomplish multiple goals herein: 1) the optical transmitter is visibly significant allowing for efficient visual acquisition by the camera 134, and 2) the optical transmitter may transmit the signal 652 from remote antenna element 650 to the integrated sighting device 110.

Dual Antenna Sighting Operations with Triggered Optical GPS Repeater (TOGR)

Figure 7:
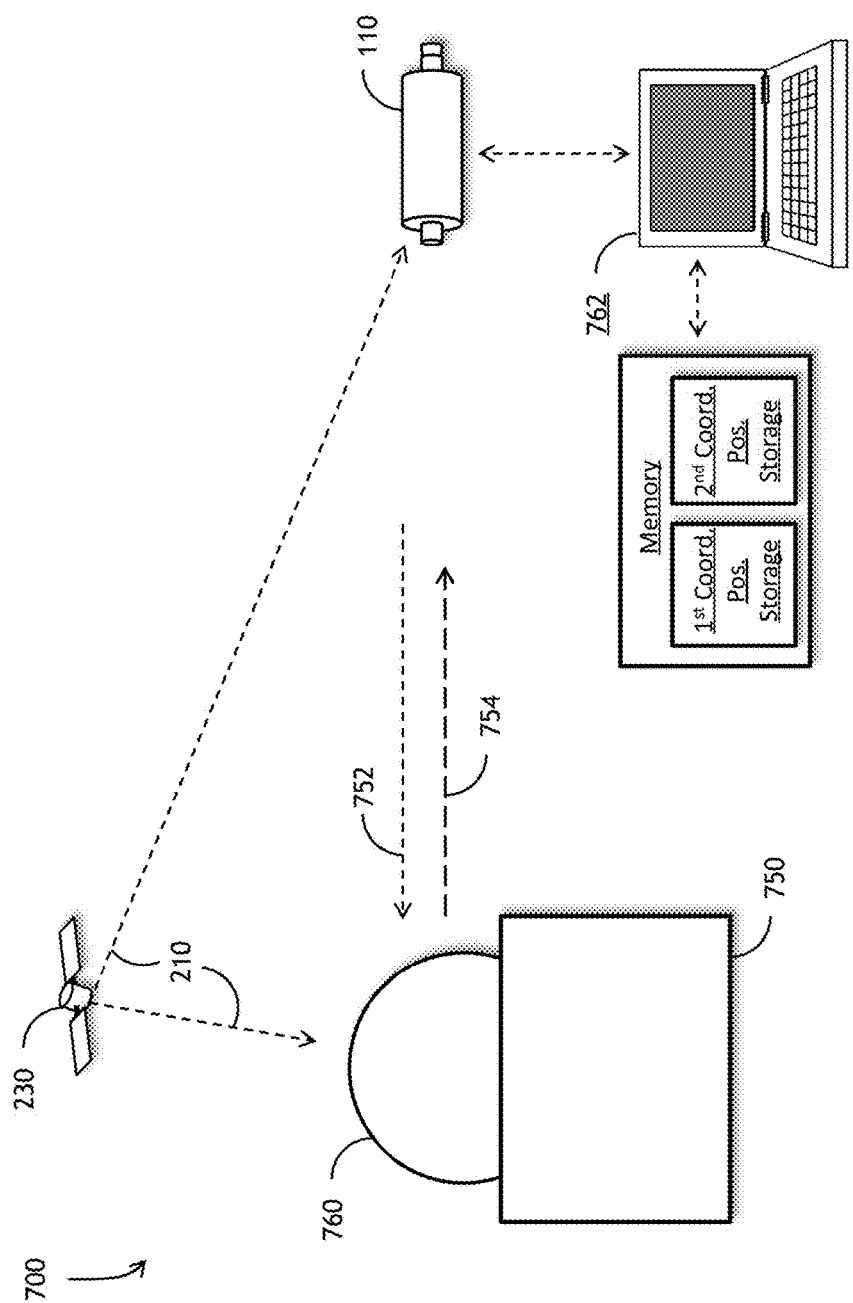
FIG. 7 is a diagram of dual antenna sighting operations with a Triggered Optical Global positioning system Repeater exemplary of an embodiment of the present invention.

Referring to FIG. 7, a diagram of dual antenna sighting operations with a Triggered Optical Global positioning system Repeater exemplary of an embodiment of the present invention is shown. In a noisy RF environment, transmitting a secondary GPS signal with an RF data link or through a long cable may be impractical. An additional embodiment of the present invention may provide a Triggered Optical Global Positioning System Repeater (TOGR) 750 to covertly transmit an optically modulated signal 754 comprising the GPS carrier phase data from TOGR 750 to the integrated sighting device 110. The optically modulated signal 754 from the LED or laser diode to the integrated sighting device 110 may be RF noise immune allowing integrated sighting device 110 to take advantage of its optical gain and high bandwidth ranging optical receiver to read the digitized GPS data in the optical signal 754 from the TOGR 750.

Preferably, the TOGR 750 would only transmit for a short period after being triggered by interrogating it with the sighting device's laser illuminator 132. It is contemplated herein; an excitation of the TOGR 750 via the laser illuminator 132 may trigger a transmission of less than one second to transmit the GPS carrier phase signal 754 to the integrated sighting device 110. Preferably, laser illuminator trigger signal 752 and GPS carrier phase signal 754 may be of different wavelengths. For example, illuminator trigger signal wavelength may operate at an exemplary 1550 nm while the LED or laser diode TOGR signal may operate at an exemplary 850 nm to ensure signal discrimination. Alternately, the LED or laser diode TOGR signal may be encoded to be discriminated from other signals in the system.

In one embodiment, TOGR 750 hardware may comprise a GPS antenna collocated with the LED or laser diode in a common housing 760, a photo sensor to receive the laser illuminator trigger signal 752 from laser illuminator 132, an analog to digital converter, power source, and associated logic circuit. Preferably, the TOGR 750 may be at least 50 m distant from the sighting position 350.

Preferably, the trigger signal 752 may be modulated and/or encoded to prevent accidental triggering (or an attempted triggering by an adversary). In addition, the power output of the laser illuminator 132 may of sufficient strength allowing for a less sensitive TOGR 750, saving power, reducing accidental triggering, and increasing difficulty for an adversary to trigger the TOGR transmission, even with the trigger code, while searching an area for the repeater.

In operation, user optically sights the collocated LED or laser diode and GPS antenna element common housing 760 of the TOGR 750 using the integrated sighting device 110 and triggers the TOGR 750 using one of the lasers 128, 130 or 132 of the integrated sighting device 110. Preferably, the laser Illuminator 132 may be used to activate and trigger the TOGR 750. User may also image the TOGR with the digital camera 134 storing a digital image of the TOGR 750 and surrounding area to enable later reacquisition. This illumination via the trigger signal 752 triggers a response from the TOGR 750. One response may include a short burst transmission of the optically modulated signal 754 readable and receivable by the integrated sighting device 110. Additional responses are contemplated herein including a burst RF transmission and a transmission of variable time.

In embodiments, the triggering modulation/code may be the same or dissimilar from the laser designation/ranging modulation. TOGR 750 may sample a down-converted GPS RF signal and transmit the data using a modulated LED or laser for a limited period. The integrated sighting device 110 detects the optical data from the TOGR 750, decodes the data as necessary and relays it to a GPS receiver 120 in the integrated sighting device 110. The integrated sighting device 110 may further determine the position of the optical signal in the optical field of view based on the image from the digital camera 134.

The GPS receiver 120 in the integrated sighting device 110 may calculate a differential relative GPS solution between the integrated sighting device 110 and TOGR 750. Using the differential GPS solution and the optical angle, the integrated sighting device 110 may determine the absolute bearing between the integrated sighting device 110 and TOGR 750.

TOGR Detail

Figure 8:
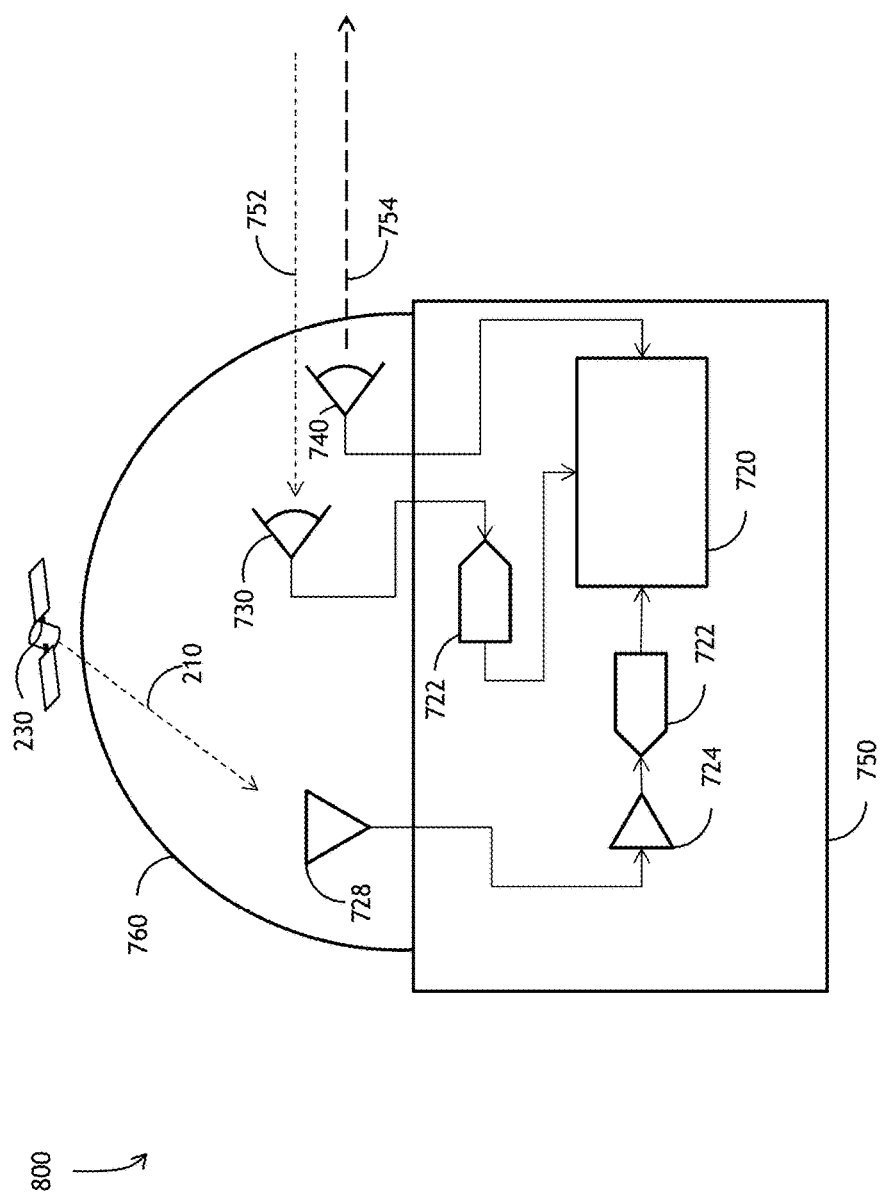
FIG. 8 is a detail diagram of a TOGR exemplary of an embodiment of the present invention.

Referring to FIG. 8, a detail diagram of a TOGR exemplary of an embodiment of the present invention is shown. Preferably, TOGR 750 may be implemented with systems having a wide range of complexities and capabilities. In one embodiment, TOGR may comprise a simple analog to digital circuit with or without advanced cryptographic encoder/decoder logic and additional functions.

TOGR 750 may include a GPS antenna element 728, preamplifier and down converter 724 to generate an Intermediate Frequency (IF) signal, and digitizers 722 to generate a digital signal in the case of an RF output requirement. Digital or analog circuitry and/or processor 720 may detect the optical trigger signal 752 and then modulate and encode the GPS data as an optically modulated signal output 754. Optically modulated signal 754 may include at least the GPS information as well as additional information or preamble such as time since trigger to help with range determination.

Preferably, GPS antenna element 728, optical emitter 740, and photo detector 730 may be collocated within a common housing 760 to aid the user in aiming the integrated sighting device 110 in a single direction to send the trigger signal 752 and receive the signal output 754 without altering the aim of the integrated sighting device 110.

TOGR may further include an optical emitter 740 with appropriate optics and optical and electrical filtering and electrical drive circuits, a modulated optical output signal 754 including GPS data, a modulated optical trigger signal 752 from integrated sighting device 110, and photo detector 730 with appropriate optics, biasing, and optical and electrical filtering. In embodiments, digitizers 722 may not be required in situations where TOGR is configured for optical processing.

In exemplary operation, TOGR 750 may receive GPS signal 210 continuously or intermittently from GPS satellite vehicle 230 and continuously compute a positioning solution based on the GPS signal 210. As TOGR 750 receives trigger signal 752 via photo detector 730, TOGR may begin to transmit the GPS positioning solution via optical emitter 740 and optically modulated signal 754. In one embodiment, TOGR may transmit a short burst transmission of a few microseconds. TOGR may further operate with a timed reply after triggering to allow round-trip ranging to aid integrated sighting device 110 in a differential GPS solution (to improve accuracy and integrity of solution).

In one embodiment, TOGR may be comprised of a flat disk or square that may be removably coupled to a side of a tree, building, rock, and stick. Additionally, TOGR may take the form of a small cubical, cylindrical or spherical package mountable on a tree branch, pole, rock, fence, on the side of corners of buildings, posts, poles and the like. Additionally, TOGR 750 may be configured for self-deployment without the need for the user to locate a fixture to which the TOGR 750 may be attached.

In one embodiment, the TOGR 750 may be configured for insertion and carriage onboard a micro UAV. Additionally, TOGR may include a camouflage/visibility configuration and be packaged in a highly visible package to enable visual or digitally imaged acquisition, and in a camouflaged package intended to blend in with the environment of the intended area of operation.

Additionally, TOGR 750 may be incorporated with reference marker 260 including retroflection tape and coating to ease location and allow passive ranging or be non-reflective to unmatched illuminators. TOGR 750 may also aid in the solution calculated by integrated sighting device 110 without ranging information between TOGR and integrated sighting device 110 where integrated sighting device 110 determines a differential GPS solution without additional range information.

Terrain Mensuration No GPS

Figure 9:
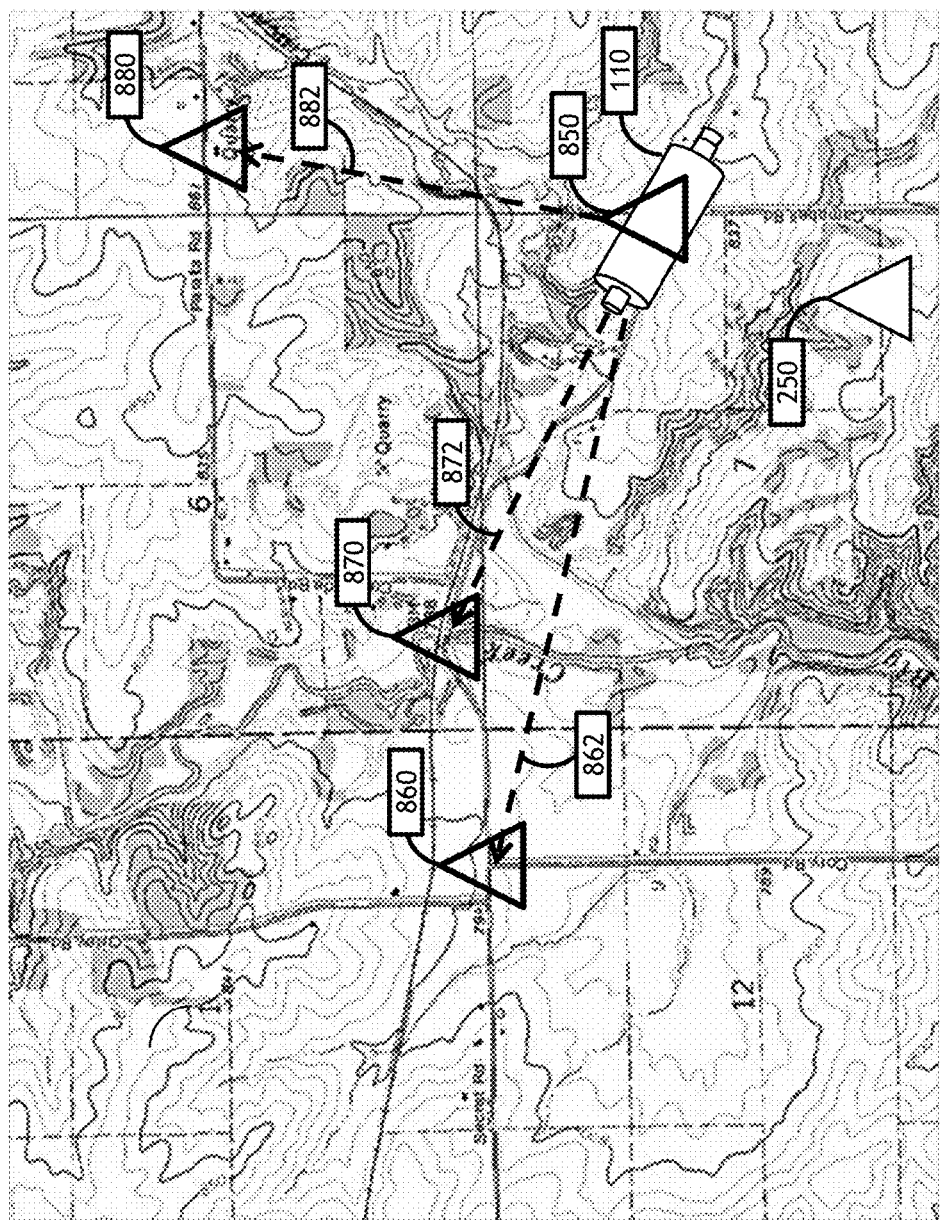
FIG. 9 is a diagram of a Terrain Mensuration mode exemplary of an embodiment of the present invention.

Referring to FIG. 9, a diagram of a Terrain Mensuration mode exemplary of an embodiment of the present invention is shown. Should GPS be intermittent or unavailable, embodiments of the present invention may continue to operate with a second level of accuracy. One non-GPS operation may include a Terrain Mensuration mode of the integrated sighting device 110.

In operation of the Terrain Mensuration mode, the user may choose the sighting position 850 based on a known position on a charted document such as a map or chart (for example, a road intersection on a chart). In sighting from a first known position 850 to a second known position 860 on the chart, the integrated sighting device 110 may determine the baseline from the sighting point 850 to the reference point 860.

In sighting from a first known position 850 to a second known position 860, the integrated sighting device 110 in this mode is not reliant upon and eliminates any interference from an external magnetic field as found in traditional magnetic options. The simplicity of two points and a sighted line between them may guarantee the operator an undisturbed precise baseline between the two points.

A first mode of the Terrain Mensuration mode may include a scenario where the user has, at one time in the past, received and stored a first position solution for the reference position 250 and a second position solution for the sighting position 850. Once these position solutions are stored, the integrated sighting device 110 may continue to operate as above, however the lack of a GPS signal to update the IMU 122 via a sighting of the reference position 250 may decrease accuracy over time. With a known sighting position 850, the user may sight visibly significant landmarks 860, 870 and 880 for which coordinates are known. With at least two points 850 and 860, and a sighting vector 862, the integrated sighting device 110 may determine an accurate baseline between the two points.

A second Terrain Mensuration mode may include a GPS denied condition, where the user has not determined a GPS position solution for either of the reference position 250 and the sighting position 850. In this scenario, the user may input the known coordinates of the sighting position 850 and the coordinates of the visibly significant landmarks 860 870 880 into the integrated sighting device 110 (for example, using general computing device 762 of FIG. 7) and then sight the landmark 860, 870 and 880 using the integrated sighting device 110 to determine an accurate baseline 862, 872 and 882 between the reference position and at least one of the visibly significant landmarks 860, 870 and 880.

Exemplary Implementation

Figure 10:
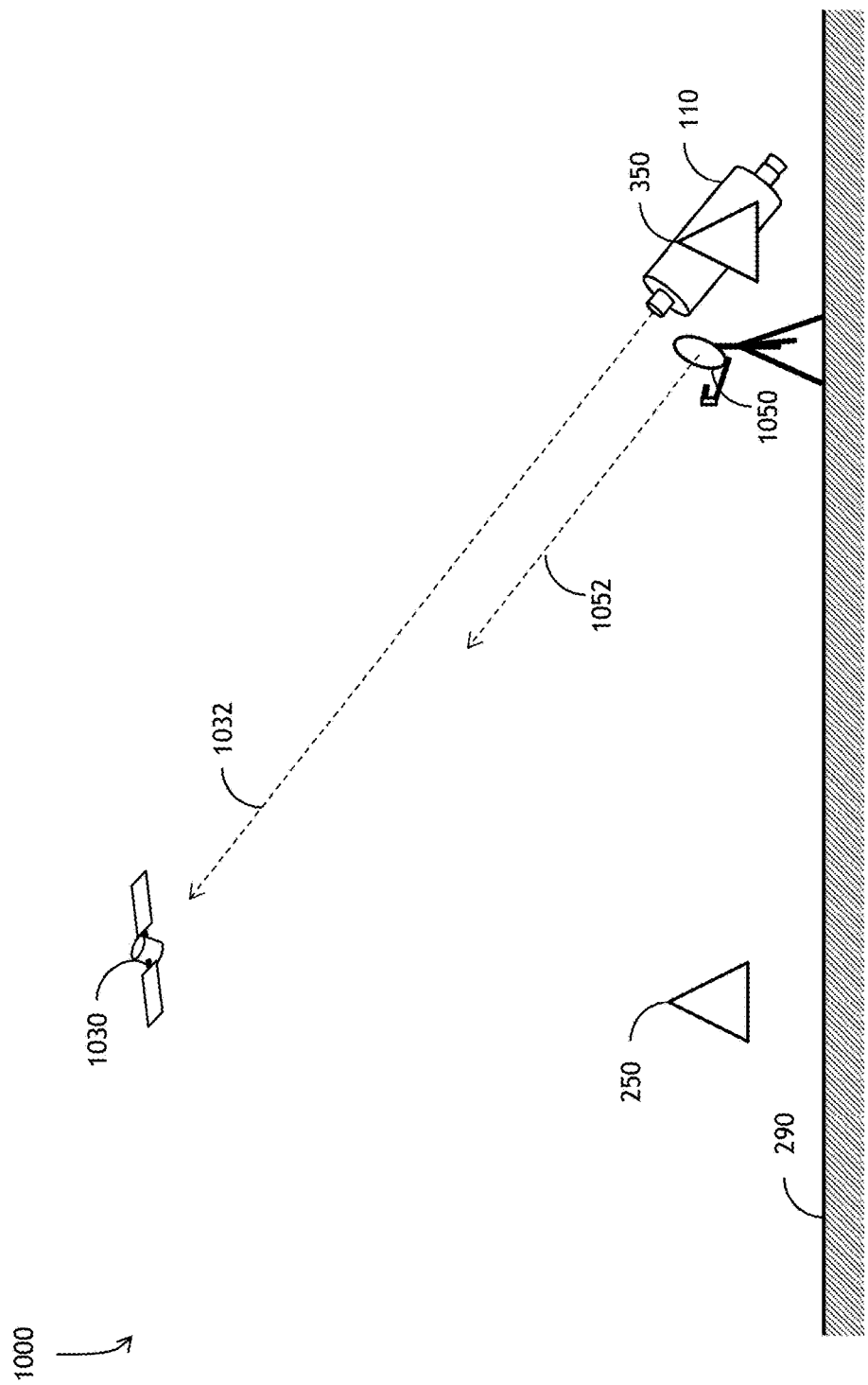
FIG. 10 is a diagram of an implementation of one embodiment of the present invention.

Referring to FIG. 10, a diagram of an implementation of one embodiment of the present invention is shown. One implementation of the present invention may include a method for aiming a receiver antenna 1050 toward a distant satellite vehicle 1030 for accurate reception of the signal transmitted by the satellite vehicle. For example, once the user has determined the precise azimuth baseline by determining and storing (i.e., in memory, see FIG. 7) the reference position 250, then determining and storing the sighting position 350, sighting the reference position from the sighting position from the sighting position, the user may sight the distant satellite vehicle 1030 through the integrated sighting device 110. In this manner, the user may determine the precise azimuth baseline 1032 between the sighting position 350 and the distant satellite vehicle 1030 and then accurately align receiver antenna 1050 on a line of sight 1052 for accurate reception.

In another exemplary embodiment, the distant satellite vehicle 1030 may not be visible to the integrated sighting device 110. If satellite vehicle 1030 is in a geosynchronous orbit, its azimuth and elevation from a reference position 250 is known. Using the methods previously described, integrated sighting device 110 can accurately acquire a precise azimuth and elevation baseline, which can be applied to the aiming vector of the receiver antenna 1050. This may be accomplished by mechanically coupling the integrated sighting device 110 to the receiver antenna 1050 in such a way that the aiming vectors of both devices are parallel.

In yet another exemplary embodiment, a distant transmitter (not shown) may not be visible to the integrated sighting device 110. The communication receiver 140 in integrated sighting device 110 may be coupled to a directional antenna (not shown) that is capable of receiving the signal from the distant transmitter. Using the methods previously described, integrated sighting device 110 can accurately acquire a precise azimuth and elevation baseline that may be compared to the baseline of the aiming vector to the distant transmitter to provide a precise absolute azimuth and elevation to the distant transmitter.

In addition, an implementation requiring a relatively fast acquisition of a precise azimuth baseline and range from a sighting position may find function within the scope of the present invention. For example, an operator of a lifting vehicle may determine a desired position of a lifting apparatus to lift a desired object. The lifting apparatus may be fitted with an embodiment of the integrated sighting device 110 and the moving object 550 may include a lifting hook or desired attachment point for the lifting hook to lift an object.

Figure 11:
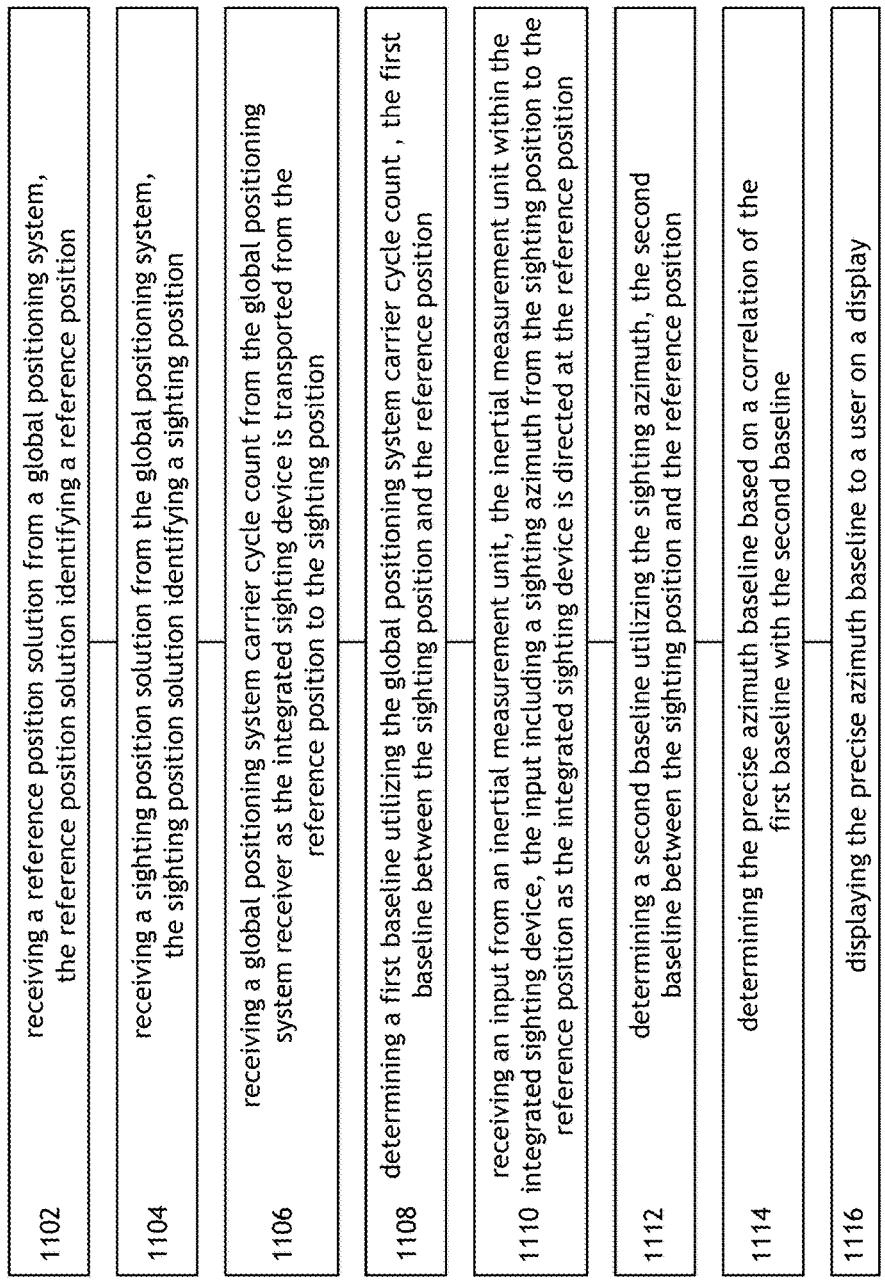
FIG. 11 is a flowchart for a method for determination of a precise azimuth baseline between a sighting position and a reference position in accordance with one embodiment of the present invention.

Referring to FIG. 11, a flowchart for a method for determination of a precise azimuth baseline between a sighting position and a reference position in accordance with one embodiment of the present invention is shown. Method 1100 begins with step 1102, with receiving a reference position solution from a global positioning system, the reference position solution identifying the reference position; and, at step 1104, receiving a sighting position solution from the global positioning system, the sighting position solution identifying the sighting position; and, at step 1106, receiving a global positioning system carrier cycle count from the global positioning system receiver as the integrated sighting device is transported from the reference position to the sighting position; and, at step 1108, determining a first baseline utilizing the global positioning system carrier cycle count, the first baseline between the sighting position and the reference position; and, at step 1110, receiving an input from an inertial measurement unit, the inertial measurement unit within the integrated sighting device, the input including a sighting azimuth from the sighting position to the reference position as the integrated sighting device is directed at the reference position; and, at step 1112, determining a second baseline utilizing the sighting azimuth, the second baseline between the sighting position and the reference position; and, at step 1114, determining the precise azimuth baseline based on a correlation of the first baseline with the second baseline; and, at step 1116, method 1100 may conclude with displaying the precise azimuth baseline to the user on a display.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

Skilled artisans will recognize a positioning signal may be received from a plurality of positioning satellite vehicle types and on a plurality of frequencies. As used herein a GPS signal may include any positioning and timing signal received from any satellite vehicle and network. A non-exclusive list of currently available satellite positioning system may include a Global Positioning System (GPS), a Global Navigation Satellite System (GNSS), a Global Navigation Satellite System (GLONASS), a Galileo system, a Beidou system, a COMPASS system, an India Regional Satellite System (IRNSS), and a QZSS system.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A sighting system, comprising:
    an integrated sighting device comprising:
        an optical aperture;
        a global positioning system (GPS) receiver connected to a first GPS antenna;
        an inertial measurement unit (IMU) for measuring an orientation; and
        a microcomputer configured for:
            transmitting a trigger signal, characterized by a first optical wavelength, to a triggered optical global positioning system repeater (TOGR);
            optically receiving a reference position solution from the TOGR via a second optical wavelength distinct from the first optical wavelength;
            receiving an orientation input from the IMU to establish a visual line of sight to the TOGR and at least one reference position, the orientation input including an angle associated with the visual line of sight; and
            determining, upon receiving the reference position solution, a first angular movement to transform the reference position solution to a sighting position solution; and
    wherein the TOGR comprises:
        a photo detector;
        an optical emitter;
        a second GPS antenna; and
        a microcomputer in data communication with the photo detector, optical emitter, and the second GPS antenna, the microcomputer configured for:
            receiving a plurality of signals from at least one GPS satellite constellation;
            computing the reference position solution based on the plurality of signals;
            receiving the trigger signal from the integrated sighting device via the photo detector; and
            transmitting the reference position solution via the optical emitter operating in the second optical wavelength.

2. The system of claim 1, wherein the integrated sighting device microcomputer is further configured to determine an angular scale factor of the IMU based on a sighting of the TOGR.

3. The system of claim 1, wherein the optical aperture is integrated with a camera of the integrated sighting device, and wherein the integrated sighting device microcomputer is further configured to:
    compare a first digital image of the at least one reference position with a second digital image of the at least one reference position;
    determine at least one corresponding feature between the first digital image and the second digital image;
    determine an azimuth baseline based on X- or Y-offsets of the at least one corresponding feature; and
    update the IMU by storing the azimuth baseline.

4. The system of claim 1, the integrated sighting device further comprising:
a camera
at least one light source; and
a filter, wherein the TOGR comprises a reflective reference position indicator, the reflective reference position indicator is configured to be illuminated by the at least one light source, light reflected from the reflective position indicator comprises filtered light, and light sensed by the camera comprises light corresponding to a wavelength of the at least one light source.

5. The system of claim 1, wherein the integrated sighting device has a front and back cross-section of less than four inches (10.16 cm) a length of less than ten inches (25.4 cm), and a weight of less than six pounds (2.72 kg) including its internal components.

6. The system of claim 1, wherein the integrated sighting device is further configured for at least one of:
receiving the sighting position solution via a user input; and
receiving the reference position solution via the user input, wherein a baseline is determined using the user input.

7. A system, comprising:
an integrated sighting device comprising:
an optical aperture;
a GPS receiver connected to a first GPS antenna;
an inertial measurement unit (IMU) configured for measuring an orientation of the integrated sighting device; and
a microcomputer configured for:
transmitting a trigger signal characterized by a first optical wavelength to a triggered optical global positioning system repeater (TOGR);
optically receiving a reference position solution from the TOGR via a second optical wavelength distinct from the first optical wavelength;
receiving an orientation input from the IMU to establish a visual line of sight to the TOGR and at least one reference position, the orientation input including an angle associated with the visual line of sight; and
determining, upon receiving the reference position solution, a first angular movement to transit the reference position solution to a sighting position; and
wherein the TOGR comprises:
a photo detector;
an optical emitter;
a second GPS antenna; and
a microcomputer in data communication with the photo detector, optical emitter, and GPS antenna, the microcomputer configured for:
receiving a plurality of signals from at least one GPS satellite constellation;
computing the reference position solution based on the plurality of signals;
receiving the trigger signal from the integrated sighting device via the photo detector; and
transmitting the reference position solution via the optical emitter in the second wavelength for a predetermined period after receiving the trigger signal.

8. The system of claim 7, wherein the optical aperture is integrated with a camera of the integrated sighting device for capturing an image of the reference position, wherein the microcomputer is further configured to algorithmically stabilize an unintentional motion of the integrated sighting device using the captured image.

9. The system of claim 7, wherein the microcomputer is further configured to determine an angular scale factor of the IMU based on a sighting of the TOGR.

10. The system of claim 7, wherein the optical aperture is integrated with a camera of the integrated sighting device, and wherein the microcomputer is further configured to:
compare a first digital image of the reference position with a second digital image of the reference position;
determine at least one corresponding feature between the first digital image and the second digital image;
determine an azimuth baseline based on one or more offsets of the at least one corresponding feature; and
update the IMU by storing the azimuth baseline.

11. The system of claim 7, the integrated sighting device further comprising:
a camera;
at least one light source; and
a filter, wherein the TOGR comprises a reflective reference position indicator, the reflective reference position indicator configured to be illuminated by the at least one light source, light reflected from the reflective position indicator comprising filtered light, and light sensed by the camera comprising light corresponding to a wavelength of the at least one light source.

12. The system of claim 10, wherein the IMU comprises an accelerometer module, the IMU is configured to store a third angle upon determining the azimuth baseline, the third angle comprising an elevation angle, and wherein the one or more offsets comprise an azimuth and elevation offset such that the microcomputer is further configured to update the IMU based on the azimuth and elevation offset of the at least one corresponding feature.

13. The system of claim 7, wherein the integrated sighting device is further configured for at least one of:
receiving the sighting position solution via a user input; and
receiving the reference position solution via the user input, wherein the first angular movement is determined using the user input and the baseline is determined based on sighting landmarks having coordinates that are known with respect to the first angular movement.

14. A method, comprising:
determining that an integrated sighting device cannot determine a position solution;
transmitting an optical trigger signal characterized by a first optical wavelength to a remote Triggered Optical Global Positioning System Repeater (TOGR);
receiving the optical trigger signal via the remote TOGR;
determining a sighting position solution via a global positioning system (GPS) receiver in the remote TOGR;
optically transmitting the sighting position solution to the integrated sighting device via a second optical wavelength distinct from the first optical wavelength;
determining, upon receiving the sighting position solution, a first angular movement to transit an optical aperture of the integrated sighting device from a reference position to the sighting position solution;
receiving an inertial measurement unit (IMU) orientation input while using the optical aperture of the integrated sighting device to establish a visual line of sight between the TOGR and a marker disposed at the reference position, the IMU orientation input including a second angle associated with the visual line of sight; and generating and displaying a baseline as a reference for the IMU based on the first angular movement correlating with the second angle.

* * * * *